United States Patent Office 3,107,225
Patented Oct. 15, 1963

3,107,225
LATEX FOAM RUBBER REINFORCED WITH A FILM OF STARCH DERIVATIVE AND METHOD OF MAKING SAME
Thomas H. Rogers, Jr., Akron, Ohio, assignor to The Goodyear Tire & Rubber Company, Akron, Ohio, a corporation of Ohio
No Drawing. Filed Dec. 8, 1960, Ser. No. 74,480
4 Claims. (Cl. 260—2.5)

This invention relates to latex foam rubber and particularly to a method of increasing the load supporting capacity of latex foam rubber.

Latex foam rubber has been produced by converting latex properly compounded into a foam, shaping the foam, coagulating the foamed latex as by gelling, and curing the gelled latex to form a highly useful material of commerce.

It has been found that the load supporting capacity of latex foam rubber may be greatly increased by compounding the rubber latex with a derivative of a starch. Any of the well-known starch derivatives may be used in the present invention, including the ester and ether derivatives of starch. Of particular interest is the hydroxyethyl ether derivative of starch, also known commercially as Amaizo 709 and sold by the American Maize Products Company of Hammond, Indiana. Another derivative that may be used in the present invention is the sodium salt of a low-substituted, acid ester derivative of starch containing both carboxylic and sulfonic acid groups and known commercially as Nu Film H, sold by National Starch Company. Ester derivatives of starch that produce the desired reinforcing effect include the acetate, propionate, butyrate, caproate, benzoate, phthalate, methyl abietate/maleic anhydride adduct, diethylene glycol, di-abietate/maleic anhydride adduct, and beta-amylose acetate. These esters include the tri-esters, such as tri-acetate, tripropionate, tributyrate and tricaproate. Other esters useful in this invention include amylose acetate and amylopectin acetate, amylose propionate and amylopectin propionate, amylose butyrate and amylopectin butyrate, amylose caproate and amylopectin caproate, amylose palmitate and amylopectin palmitate, and amylose benzoate and amylopectin benzoate. Unsaturated esters of starch may also be employed, including allyl starch. Alkyl/allyl mixed ether derivatives of starch may also be used. The allyl groups may vary from the ethyl to the heptyl and also include the lauryl radicals. Other mixed ethers include the ethyl, butyl, amyl, benzyl, ortho-chlorobenzyl and chlorobenzyl allyl ethers of starch. Also, starch derivatives of the mixed ether/ester variety may be used, including allyl starch acetate and allyl starch laurate, allyl starch propionate, allyl starch stearate, allyl starch oleate, allyl starch linoleate, allyl starch carbonate, allyl starch benzoate, and allyl starch phenylcarbamate. The copolymer of allyl starch and styrene may also be used in the present invention as a means of improving the load carrying capacity of latex foam rubber.

The starch derivatives useful in this invention may be made from any of the well-known starches, including potato, sweet potato, corn, tapioca, rice, wheat and barley.

The starch derivatives may be used in amounts ranging from 0.8% to 20% and preferably from about 3% to about 9%, depending, of course, upon the amount of stiffening desired to be introduced into the latex foam rubber.

It has also been discovered that the same desirable improvement in stock efficiency may be obtained when these starch derivatives are used in either the gelatinized or the ungelatinized form, thus permitting more latitude in carrying out the process of the present invention in the manufacture of latex foam rubber.

Generally, a saving of compounding materials of the type known as conventional fillers may be realized up to about 25% for each 3 parts of starch derivative used. For normal cushioning use, amounts of starch derivative greater than about 3 through about 5% may be used if a plasticizer and particularly an oil, such as mineral oil, is added to the latex compound.

It is desirable, when larger quantities of starch derivative are used, to use the starch derivative in combination with an oil to suppress combustion-supporting tendencies of the starch when used in these larger amounts.

It has been discovered that the starch derivatives of this invention may be used in either a gelatinized or ungelatinized condition. Normally, starch obtained direct from the starch producing plant is in the ungelatinized condition. In this condition, the starch, as such, may be formed into a non-viscous dispersion and added to the latex in the production of latex foam rubber, which starch then functions as a reinforcing agent.

The latex for use in making latex foam rubber may be a natural rubber latex or any of the well-known synthetic rubber latices and their equivalents, including a conjugated diene polymer synthetic rubber latex or mixtures thereof. A specific diene polymer synthetic rubber latex may be an aqueous emulsion polymerizate of one or a mixture of conjugated butadienes, for example butadiene-1,3, polymerized alone or with one or more other polymerizable compounds which are capable of forming rubbery copolymers with the conjugated butadienes, particularly acrylonitrile and the aryl olefins such as styrene. For a method of preparing a butadiene-1,3/styrene rubber latex see I.E.C. 40, 769–777 (1948).

In making latex foam rubber reinforced with a starch derivative, the rubber latex is compounded with the usual vulcanizing and compounding ingredients added in the conventional manner as aqueous solutions or pastes just prior to the time the latex is to be foamed by beating with air or chemically with hydrogen peroxide and the like in the form of an aqueous solution of from 25–45% solids.

Other compounding ingredients include gellants, particularly of the delayed action type such as the alkali silicofluorides which may be added to the foam just prior to introduction of the foam latex into a mold. Gelling is then effected by permitting sufficient time to elapse to cause the sodium silicofluoride to drop the pH of the system in the well-known manner.

The starch derivatives disclosed herein may be added either to the latex prior to foaming or to the latex during foaming, or after foaming, but prior to gelation thereof. The starch derivatives may be added as an aqueous dispersion or as a solution in the suitable solvent. Care must be taken during the addition of the starch derivative to the foam that the foam does not collapse.

In addition to the compounding ingredients mentioned above, the rubber latex to be foamed after being stabilized with conventional stabilizing agents may be compounded with a thickening agent such as casein, gum tragacanth or water glass; conventional antioxidants, including phenyl beta naphthylamine; conventional accelerators, including the zinc salt of mercaptobenzothiazole; conventional lubricants, including castor oil; loading agents, including carbon black, magnesium oxide and calcium silicate; paraffin waxes, which improve the snap or rebound property of the finished sponge; and other conventional compounding ingredients.

The reinforced latex foam rubber, prepared in accordance with the present invention, may be used in the same manner as the latex foam rubber of the prior art and is particularly useful in the fabrication of household furniture cushions, automobile seat cushions, and undercarpet padding.

Further details of the preparation of latex foam rubber in accordance with the present invention are set forth in the following examples, all parts and percentages being by dry weight, unless otherwise identified.

EXAMPLE 1

(Ungelatinized Derivative of Starch)

The following ingredients were used in making a latex foam rubber cushion:

| | Parts (dry weight) |
|---|---|
| Synthetic rubber latex | 100 |
| Antioxidant [1] | 1 |
| Sulfur (curing agent) | 1.8 |
| Ethyl zimate (accelerator of cure) | 0.5 |
| Zinc mercaptobenzothiazole (accelerator of cure) | 1.5 |
| Amaizo 709 (hydroxyethyl ether derivative of corn starch, ungelatinized) | 3 |
| Clay (filler) | 10 |

[1] A commercial non-staining antioxidant comprising a mixture of alkylated phenols or styrenated phenols.

Each of the above-identified compounding ingredients was added as a dispersion to the rubber latex and thoroughly blended therewith and the blend allowed to mature for two hours at 80° F.

This matured latex blend was then frothed in the usual manner using a conventional beater to cause air to be trapped in the latex and thereby form the desired foam, to which foam was added the following ingredients:

| | Parts (dry weight) |
|---|---|
| Diphenyl guanidine | 0.6 |
| Zinc oxide (activator of cure) | 3.0 |
| Sodium silicofluoride (gellant) | 2.5 |

The resulting latex foam rubber was then poured into a mold cavity of conventional construction which was closed by lowering the cover containing lugs, thereby causing the enclosed foam to conform to the shape of the mold cavity with excess foam leaving the cavity through an overflow vent. The molded latex foam rubber became gelled within 2½ minutes from the time the foam latex had been placed in the mold. The gelled latex was then vulcanized in an open-steam autoclave at 210° F. for 15 minutes. The resulting latex foam rubber was then dried for two hours at 250° F. The latex foam rubber had a stock efficiency of +8.0% as compared to 0% when cornstarch was used.

EXAMPLE 2

(Gelatinized Starch Derivative)

A hydroxyethyl ether starch derivative (Amaizo 709) was used in foam rubber by incorporating it, in gelatinized form, in a 100% synthetic latex prior to compounding.

Three parts of Amaizo 709 (25% ungelatinized slurry) was added to a styrene/butadiene rubber latex and then heated to 155° F. for 20 minutes. The ungelatinized Amaizo 709 was gelatinized in situ as evidenced by a thickening of the system. This blend was then cooled to 80° F. and compounded as follows:

| | Parts (dry weight) |
|---|---|
| Synthetic rubber latex/Amaizo 709 blend prepared as above | 103 |
| Sulfur | 1.8 |
| Zinc mercaptobenzothiazole | 1.5 |
| Ethyl zimate | 0.5 |
| Antioxidant [1] | 1.0 |
| Potassium rosinate | 0.6 |

[1] A commercial non-staining antioxidant comprising a mixture of alkylated phenols or styrenated phenols.

This latex mix was then frothed and the following compounds were added:

| | Parts (dry weight) |
|---|---|
| Zinc oxide | 3.0 |
| Diphenyl guanidine | 0.6 |
| Sodium silicofluoride | 2.5 |

The gelled foam was cured for 15 minutes at 212° F. in open steam, washed and dried for 1½ hours at 250° F.

Foam rubber made in this manner had a stock efficiency of +9.7% as compared to 0% for the control which contained three parts of cornstarch added to the latex in the ungelatinized form.

Stock efficiency is a measure of the relative load carrying capacity of two different latex foam rubbers, one of which is a standard. A stock efficiency of −1% indicates that 1% greater weight of latex foam rubber material is needed to develop the same resistance to compression as is developed by the standard. A stock efficiency of +1% indicates that 1% less weight of latex foam rubber material is needed to develop the same resistance to compression as is developed by the standard.

While certain representative embodiments and details have been shown for the purpose of illustrating the invention, it will be apparent to those skilled in this art that various changes and modifications may be made therein without departing from the spirit or scope of the invention.

I claim:

1. Latex foam rubber comprising a cellular body of intercommunicating cells, the walls of said cells being made of a film of rubber reinforced with a film of starch derivative resulting from the removal of water from a watery film of starch derivative formed by heat from a dispersion of starch derivative selected from the group consisting of starch containing ester substituents, starch containing ether substituents and starch containing both ester and ether substituents, the starch derivative film being in reinforcing relationship with said film of rubber and being present in amount from about 1 part to about 20 parts per 100 parts of rubber.

2. Latex foam rubber comprising a cellular body of intercommunicating cells, the walls of said cells being made of a film of rubber resulting from the coagulation of a rubber latex and reinforced with a film of a starch derivative resulting from the removal of water from a starch derivative originally dispersed with said rubber latex, the starch derivative being selected from the group consisting of starch containing ester substituents, starch containing ether substituents and starch containing both ester and ether substituents, the starch derivative being present in amount from about 1 part to about 20 parts per 100 parts of rubber.

3. Latex foam rubber comprising a cellular body of intercommunicating cells, the walls of said cells being made of a film of rubber resulting from the coagulation of a conjugated diene rubber latex reinforced with a film of starch derivative initially dispersed with said rubber latex, said starch derivative containing a hydroxyethyl ether substituent, the starch derivative being present in amount from about 1 part to about 20 parts per 100 parts of rubber.

4. A method of producing latex foam rubber which comprises foaming rubber latex having dispersed therein from about 1 part to about 20 parts per 100 parts of rubber of a starch derivative selected from the group consisting of starch containing ester substituents, starch containing ether substituents and starch containing both ester and ether substituents, to form a cellular body, the cells of which comprise walls containing a dispersion of rubber particles and starch particles in amount of from about 1 part to about 20 parts per 100 parts of rubber, coagulating the foam rubber and thereafter heating the foam rubber to convert said coagulated mass into a film of vulcanized rubber and a film of starch reinforcing said vulcanized rubber.

References Cited in the file of this patent
UNITED STATES PATENTS

| | | |
|---|---|---|
| 2,138,081 | Wolf | Nov. 29, 1938 |
| 2,516,634 | Kesler et al. | July 25, 1950 |
| 2,613,206 | Caldwell | Oct. 7, 1952 |
| 2,662,064 | Mead | Dec. 8, 1953 |
| 2,711,977 | Butsch | June 28, 1955 |
| 2,945,826 | Everett | July 19, 1960 |